No. 718,528. PATENTED JAN. 13, 1903.
J. H. RAST.
BICYCLE SEAT POST CLAMP.
APPLICATION FILED MAY 27, 1902.
NO MODEL.
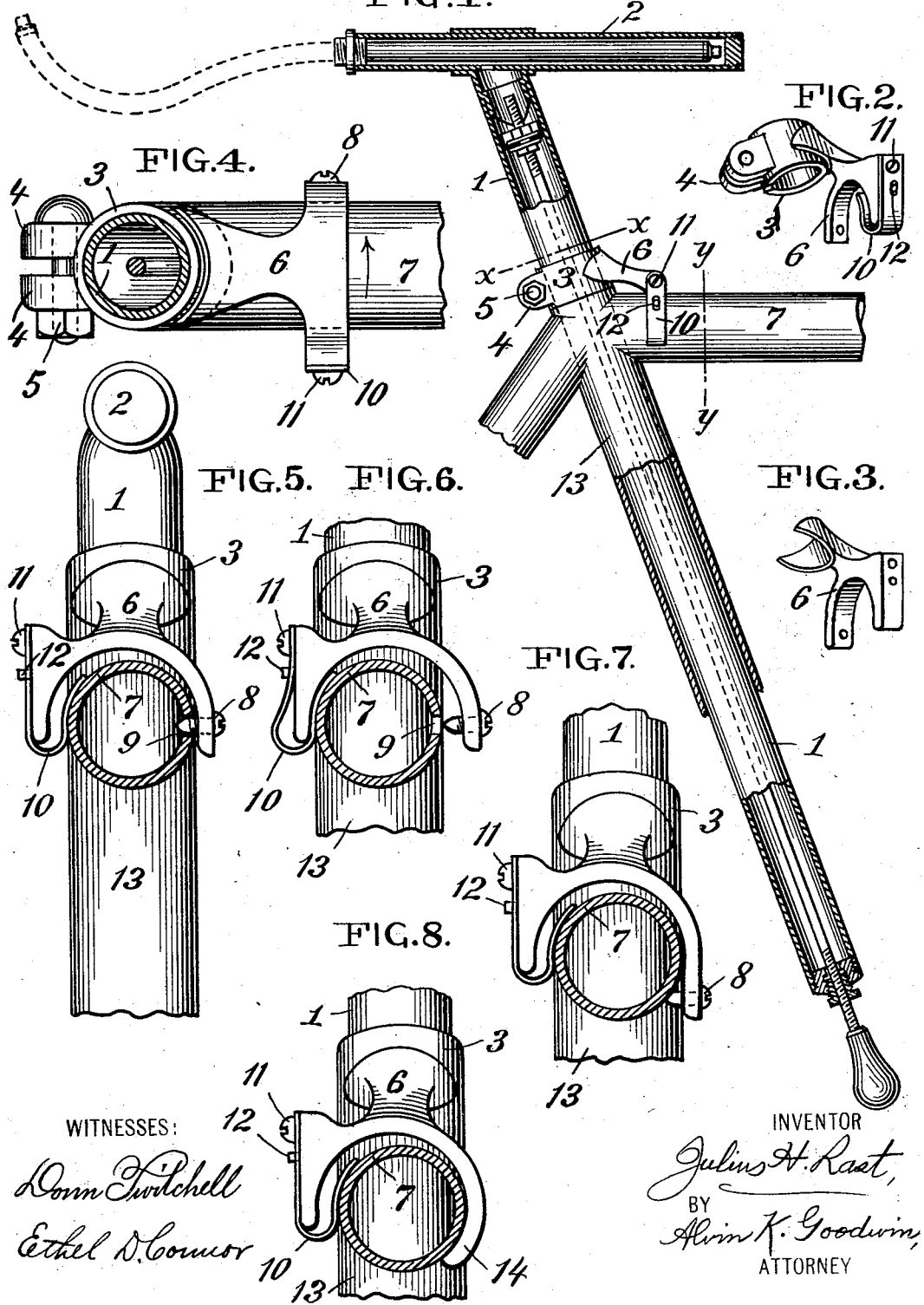
WITNESSES:
INVENTOR
Julius H. Rast,
BY
Alvin K. Goodwin,
ATTORNEY

UNITED STATES PATENT OFFICE.

JULIUS H. RAST, OF CHARLESTON, SOUTH CAROLINA.

BICYCLE-SEAT-POST CLAMP.

SPECIFICATION forming part of Letters Patent No. 718,528, dated January 13, 1903.

Application filed May 27, 1902. Serial No. 109,172. (No model.)

*To all whom it may concern:*

Be it known that I, JULIUS H. RAST, a citizen of the United States of America, residing at the city of Charleston, in the county of Charleston and State of South Carolina, have invented a new and Improved Bicycle-Seat-Post Clamp, of which the following is a specification.

This invention has for its object to provide an improved clamping device adapted to sustain the rider's seat or saddle at any desired height, while preventing dangerous sidewise turning of the saddle on the bicycle-frame and permitting very quick and easy removal of the seat-post and saddle from the frame to lessen the danger of the bicycle being stolen, and also to allow inflation of the pneumatic tires of the bicycle when the seat-post is fitted as a pump in accordance with my prior United States patent, No. 668,314. This clamping device permits almost instant readjustment of the saddle to riding position on the bicycle-frame.

The invention will first be described and then will be particularly defined in claims hereinafter set forth.

Reference is made to the accompanying drawings, forming part of this specification, and in which—

Figure 1 is a sectional side elevation showing the improved clamp secured to a seat-post which is fitted as a tire-inflating pump. Fig. 2 is a bottom perspective view of the clamp device removed from the seat-post and bicycle-frame. Fig. 3 is a detail perspective view of the yoke-lug of the clamp-collar. Fig. 4 is an enlarged detail plan view with the seat-post in section on the line $x$ $x$ in Fig. 1. Fig. 5 is a detail front elevation with the upper bicycle frame-bar in vertical section on the line $y$ $y$ in Fig. 1. Fig. 6 is a front sectional view showing the operation of the clamp-collar when applying or removing the seat-post and saddle, and Figs. 7 and 8 are detail front sectional views illustrating modifications of the clamp-yoke.

Referring first more particularly to Figs. 1 to 6, inclusive, of the drawings, it will be seen that the clamp has a collar which may be held in any suitable manner upon the stem 1 of the bicycle seat-post 2. I prefer to use a split collar 3, having two lugs 4 4, into which the usual clamping-bolt 5 is fitted. The chief peculiarity of this clamp-collar is its forwardly-extending yoke 6, which is rigidly fixed at its arch-lug to the side of the collar and has opposite pendent limbs adapting the yoke to straddle the top bar 7 of a bicycle-frame. I prefer to separately make or form the yoke 6 by casting or otherwise and then braze it to collar 3 of the clamp device. One limb of the yoke 6 is preferably fitted with a screw 8, which is adapted to enter a hole 9, specially made for it in the bicycle frame-bar 7, and to the other yoke-limb is fixed one end of a suitable spring, which is preferably made U-shaped and has its free end extending within the yoke and adapted to press against the frame-bar 7 to hold the locking screw or stud 8 within the frame-hole 9. I prefer to hold the spring 10 to the yoke 6 by a screw 11, and I also prefer to provide the spring with a slot which receives a guide stud or pin 12, set into the yoke-limb to prevent turning of the spring on the screw 11 and always hold the spring in proper operative position. Two screws may be used instead of the screw 11 and stud 12; but the latter are preferred, as they provide for more full and free elastic action of the spring, which is made quite strong or heavy in order to exert considerable pressure on the side of the bicycle-frame.

The screw 8 is intentionally given a conical or sharpened end to allow it to be turned in against the bicycle frame-bar 7 to mark said bar at the precise place where the hole 9 is to be bored in the bar to receive the screw. This feature of utilizing the laterally-movable screw or part as a marker to assure boring the latch-hole 9 at the proper place in the bicycle-frame to receive the locking screw or part is claimed in my prior companion patent application having Serial No. 82,745, the novelty of the clamp herein shown consisting in fitting said screw or stud marker into one limb of a yoke which straddles a bar of the bicycle-frame. After the hole 9 is bored in the frame-bar the screw 11 will be turned fully inward until its head strikes the yoke and its pointed end projects in position to enter said hole 9 of the bicycle-frame. The yoke-limbs are separated sufficiently to allow play of the spring 10 within the yoke and between it and the bicycle-frame during adjustment of the seat-post.

The operation is very simple and effective and as follows: The collar 3 is first fastened to the seat-post stem 1 by the bolt 5 or otherwise, so as to hold the saddle on the bar 2 at proper height on the bicycle-frame to suit the rider when the collar 3 rests on the sloping rear part or tube 13 of the bicycle-frame. When the seat-post stem 1 is inserted in the frame-tube 14, the clamp-yoke 6 falls astride of the top frame-bar 7, and as the seat-post is pushed down to final position the spring 10 yields against one side of the bar 7 until the inwardly-projecting locking screw or stud 8 comes opposite the hole 9 of the frame, whereupon the spring expands and forces the screw into the hole 9 to lock the seat-post and saddle against vertical displacement and also prevent dangerous sidewise movement of the saddle, while the collar 3 rests solidly on the top of the bicycle-frame to support the rider. The seat-post and saddle may be almost instantly removed by simply pressing on the collar-yoke 6 at its side next the spring 10 to compress this spring and at the same time carry the locking screw or stud 8 out of the frame-hole 9, as shown in Fig. 6 of the drawings, and thus permit the entire seat-post and saddle to be lifted from the frame to allow the rider to let the bicycle stand at the roadside or elsewhere while out of use and with little danger of the vehicle being stolen or to allow the removed seat-post and saddle to be set inverted on the ground to permit convenient use of the seat-post pump for inflating the bicycle-tires, as fully described in my aforesaid prior patent, No. 668,314.

It is not necessary to use the hole 9 in the bicycle-frame, as the yoke-limb carrying the screw or stud 8 can be lengthened to permit the end of the screw to pass or take under the side of the bicycle frame-bar 7 below its center and as illustrated in Fig. 7 of the drawings.

Both the frame-hole 9 and the screw or stud 8 may be dispensed with if that limb of the yoke opposite the spring-carrying limb be curved inward sufficiently at its end to embrace the under side of the frame-bar, as shown at 14 in Fig. 8 of the drawings.

My invention is not limited to a seat-post collar provided with a yoke straddling the bicycle-frame and having opposite limbs, to one of which a spring is applied for locking the seat-post and saddle to the bicycle-frame, as said yoke within the scope of my invention may have any means engaging opposite sides of the frame and locking the seat-post and saddle to the frame, while permitting their convenient removal for purposes herein described.

I claim as my invention—

1. A bicycle-seat-post clamp comprising a collar adapted for fastening to the seat-post stem and provided with a yoke adapted to straddle the bicycle-frame, said yoke having means engaging opposite sides of the frame and locking the seat-post and saddle to the frame and permitting their convenient removal, substantially as described.

2. A bicycle-seat-post clamp comprising a collar adapted for fastening to the seat-post stem and provided with a yoke adapted to straddle the bicycle-frame, one limb of said yoke having a part engaging the frame and its other limb having a spring acting within the yoke and against the frame and locking the seat-post and saddle in riding position and permitting their convenient removal, substantially as described.

3. A bicycle-seat-post clamp comprising a collar adapted for fastening to the seat-post stem and provided with a yoke adapted to straddle the bicycle-frame, one limb of said yoke having a part engaging the frame and its other limb having a U-shaped spring the inner part of which acts within the yoke and against the bicycle-frame to lock the seat-post and saddle to the frame and permit their convenient removal, substantially as described.

4. A bicycle-seat-post clamp comprising a collar adapted for fastening to the seat-post stem and provided with a yoke adapted to straddle the bicycle-frame, one limb of said yoke having a screw or stud adapted to enter a hole in the bicycle-frame and its other limb having a spring acting within the yoke and against the frame and locking the screw or stud in the frame to hold the seat-post and saddle in riding position and permit their convenient removal, substantially as described.

5. A bicycle-seat-post clamp comprising a collar adapted for fastening to the seat-post stem and provided with a yoke adapted to straddle the bicycle-frame, one limb of said yoke having a laterally-movable screw or stud whose inner end is adapted to mark the bicycle-frame at the place for boring the hole to receive said screw or stud, and its other limb having a spring acting within the yoke and against the frame and locking the screw or stud in the frame-hole to secure the seat-post and saddle in riding position and permit their convenient removal, substantially as described.

6. A bicycle-seat-post clamp comprising a split collar 3 having lugs 4, 4 and bolt 5, and provided with a forwardly-extending yoke 6 having one limb adapted to engage the bicycle-frame and having at its other limb a U-shaped spring 10 held to the yoke by a screw 11 and stud 12, and having its upbent end extending within the yoke for acting on the bicycle-frame, substantially as described.

JULIUS H. RAST.

Witnesses:
JOHN W. JOURDAN,
JOS. E. THOMPSON.